(12) United States Patent
Shin et al.

(10) Patent No.: US 11,890,975 B2
(45) Date of Patent: Feb. 6, 2024

(54) FOLDING SEAT

(71) Applicant: DAECHANG SEAT CO., LTD-DONGTAN, Hwaseong-si (KR)

(72) Inventors: Jae Kwang Shin, Osan-si (KR); Myung Soo Lee, Osan-si (KR); Chan Ki Cho, Gangwon-do (KR)

(73) Assignee: DAECHANG SEAT CO., LTD-DONGTAN, Hwaseong-si (KR)

( * ) Notice: Subject to any disclaimer, the term of this patent is extended or adjusted under 35 U.S.C. 154(b) by 138 days.

(21) Appl. No.: 17/503,681

(22) Filed: Oct. 18, 2021

(65) Prior Publication Data

US 2022/0118890 A1 Apr. 21, 2022

(30) Foreign Application Priority Data

Oct. 21, 2020 (KR) .......................... 10-2020-0136891

(51) Int. Cl.
*B60N 2/30* (2006.01)
*B60N 2/36* (2006.01)
*B60N 2/68* (2006.01)

(52) U.S. Cl.
CPC ............ *B60N 2/3011* (2013.01); *B60N 2/305* (2013.01); *B60N 2/3047* (2013.01); *B60N 2/366* (2013.01); *B60N 2/68* (2013.01)

(58) Field of Classification Search
CPC ............................. B60N 2/3047; B60N 2/305
See application file for complete search history.

(56) References Cited

U.S. PATENT DOCUMENTS

| 7,611,200 | B2 | 11/2009 | Jovicevic et al. | |
|---|---|---|---|---|
| 2004/0032155 | A1 | 2/2004 | Yamada et al. | |
| 2007/0052255 | A1* | 3/2007 | O'Connor | B60N 2/01583 296/65.03 |
| 2013/0049425 | A1* | 2/2013 | Runde | B60N 2/206 297/354.12 |
| 2017/0088020 | A1* | 3/2017 | Poniatowski | B60N 2/938 |
| 2021/0402904 | A1* | 12/2021 | Sera | B60N 2/305 |

FOREIGN PATENT DOCUMENTS

| CN | 111114403 | A | * | 5/2020 | .......... B60N 2/3047 |
|---|---|---|---|---|---|
| CN | 114179687 | A | * | 3/2022 | |
| EP | 3473543 | A2 | | 4/2019 | |

(Continued)

OTHER PUBLICATIONS

Office Action for Chinese Application No. 202111208397.X dated Mar. 29, 2023, with its English translation, 9 pages.

(Continued)

*Primary Examiner* — Timothy J Brindley
(74) *Attorney, Agent, or Firm* — Bret E. Field; Bozicevic, Field & Francis LLP

(57) ABSTRACT

Proposed is a folding seat which can be folded by manipulating a lever at various positions so as to improve the utilization of space around the folding seat. The folding seat includes: a seat frame; a seat back frame located at a rear of the seat frame and coupled rotatably to the seat frame or a vehicle; and a first latch part provided with a side support, a first end of the side support being coupled to the vehicle and a second end of the side support being coupled to the rear of the seat frame through a rotation shaft such that the seat frame is rotatable.

5 Claims, 6 Drawing Sheets

(56) References Cited

FOREIGN PATENT DOCUMENTS

| | | | |
|---|---|---|---|
| FR | 3116479 A1 * | 5/2022 | |
| JP | H7-2004 A | 1/1995 | |
| JP | 2001-163095 A | 6/2001 | |
| JP | 2006-188210 A | 7/2006 | |
| JP | 2007-176404 A | 7/2007 | |
| JP | 2009-67309 A | 4/2009 | |
| JP | 2016-120916 A | 7/2016 | |
| KR | 10-0794038 B1 | 1/2008 | |
| KR | 1020080017062 A | 2/2008 | |
| KR | 10-1643888 B1 | 8/2016 | |
| KR | 1020170076211 A | 7/2017 | |
| WO | WO-2016076318 A1 * | 5/2016 | ............. B60N 2/015 |

OTHER PUBLICATIONS

Extended European Search Report for European Application No. 21202108.3 dated Mar. 18, 2022, 7 pages.
Office Action for Japanese Application No. 2021-169435 dated Nov. 30, 2022, with its English translation, 8 pages.
Office Action for Korean Application No. 10-2020-0136891 dated Feb. 8, 2022, with its English translation, 5 pages.
Decision to Grant for Korean Application No. 10-2020-0136891 dated Feb. 22, 2022, with its English translation, 2 pages.

* cited by examiner

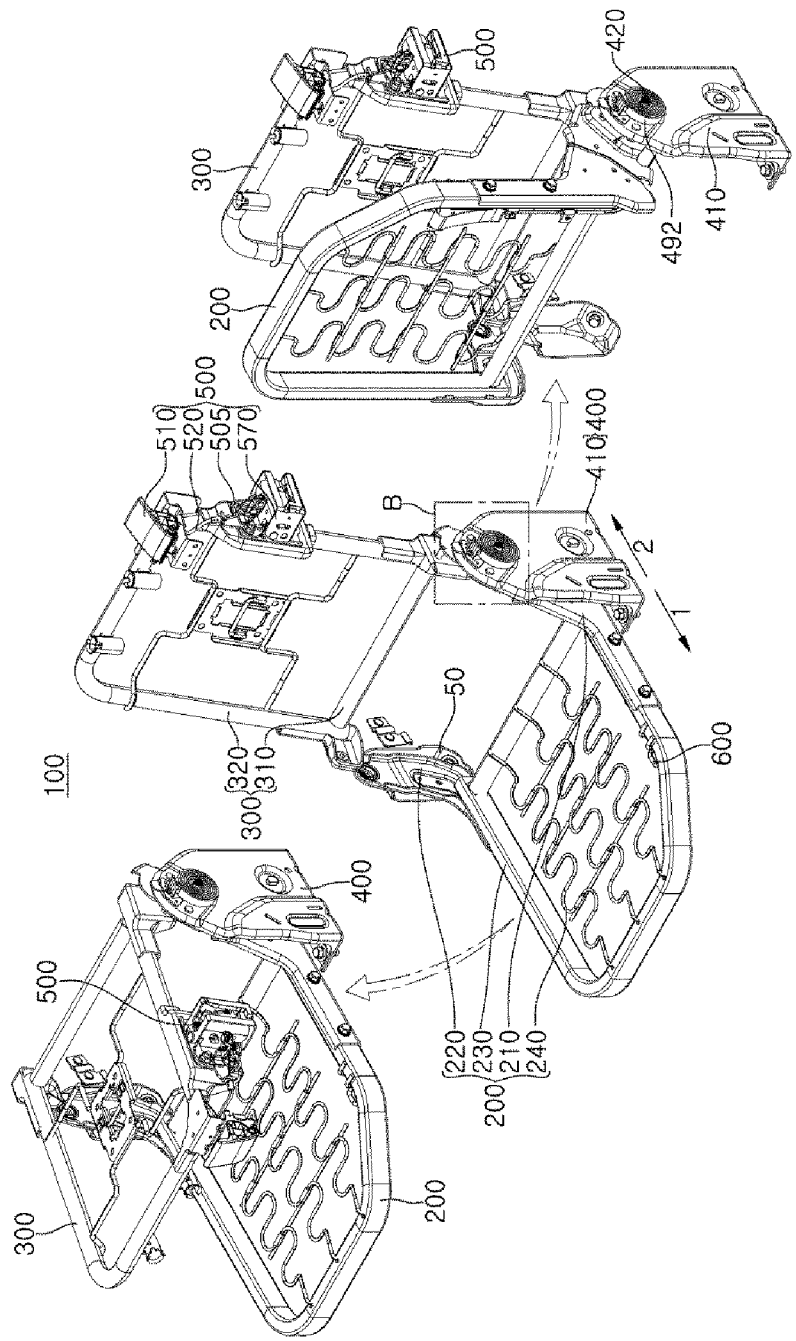
[Fig. 1]

[Fig. 2]
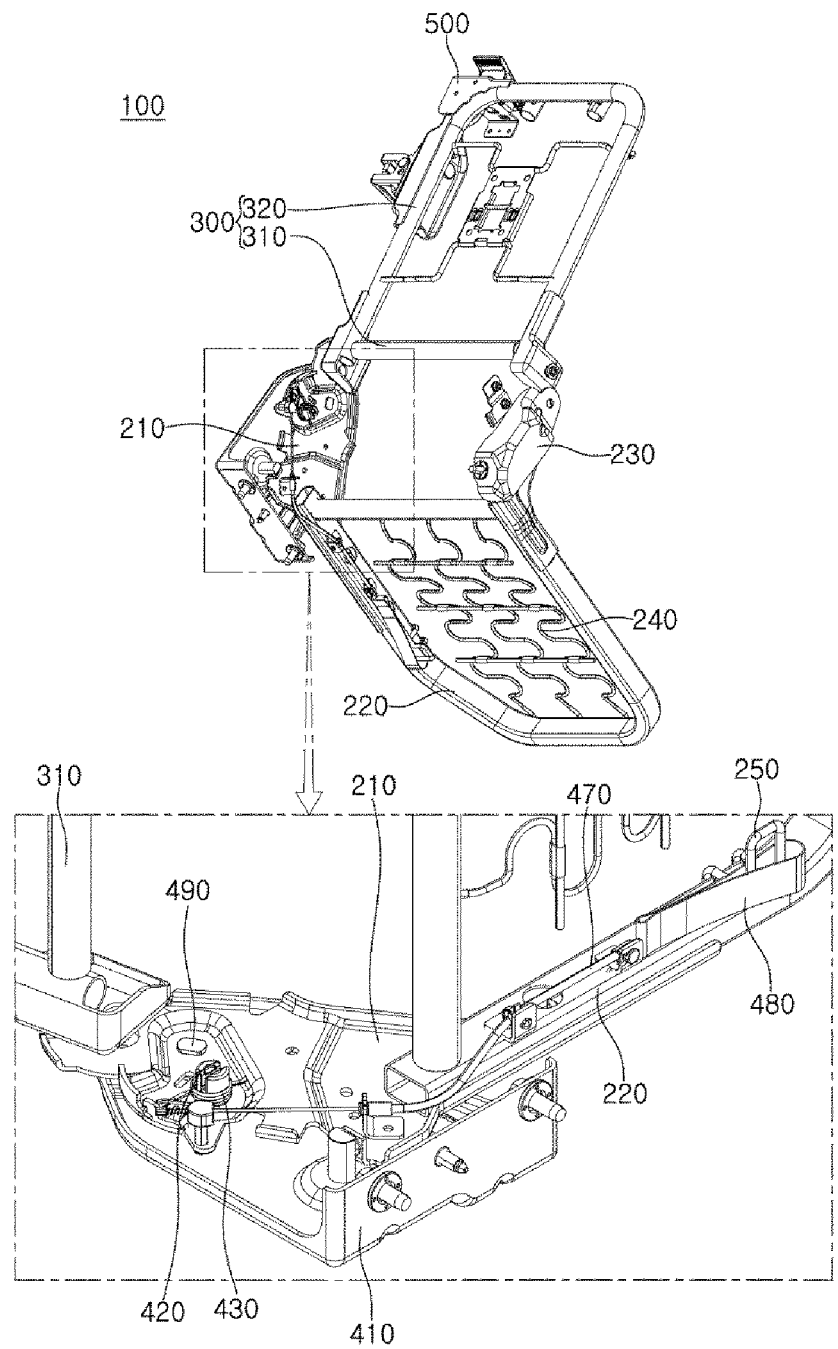

[Fig. 3]
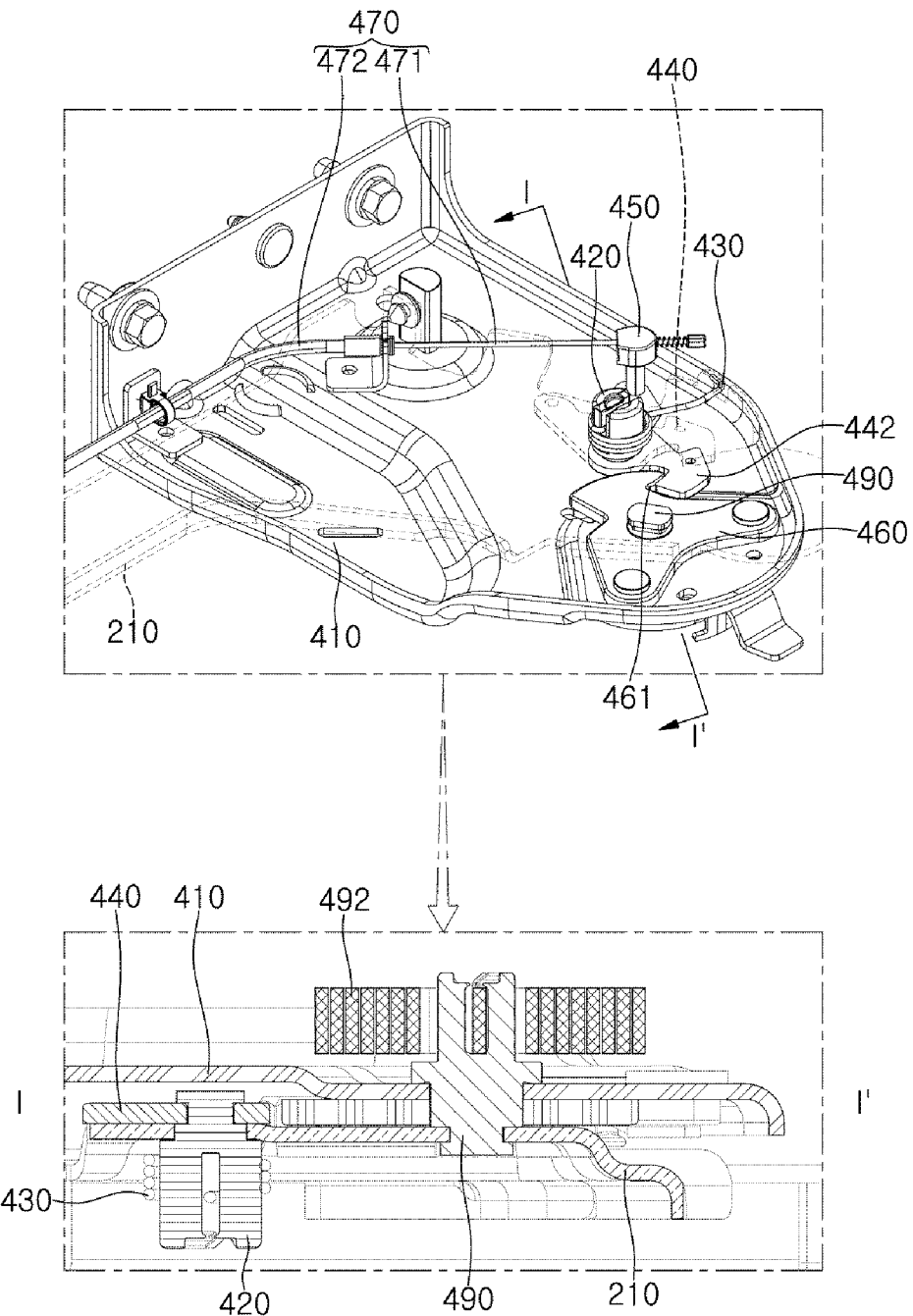

[Fig. 4]
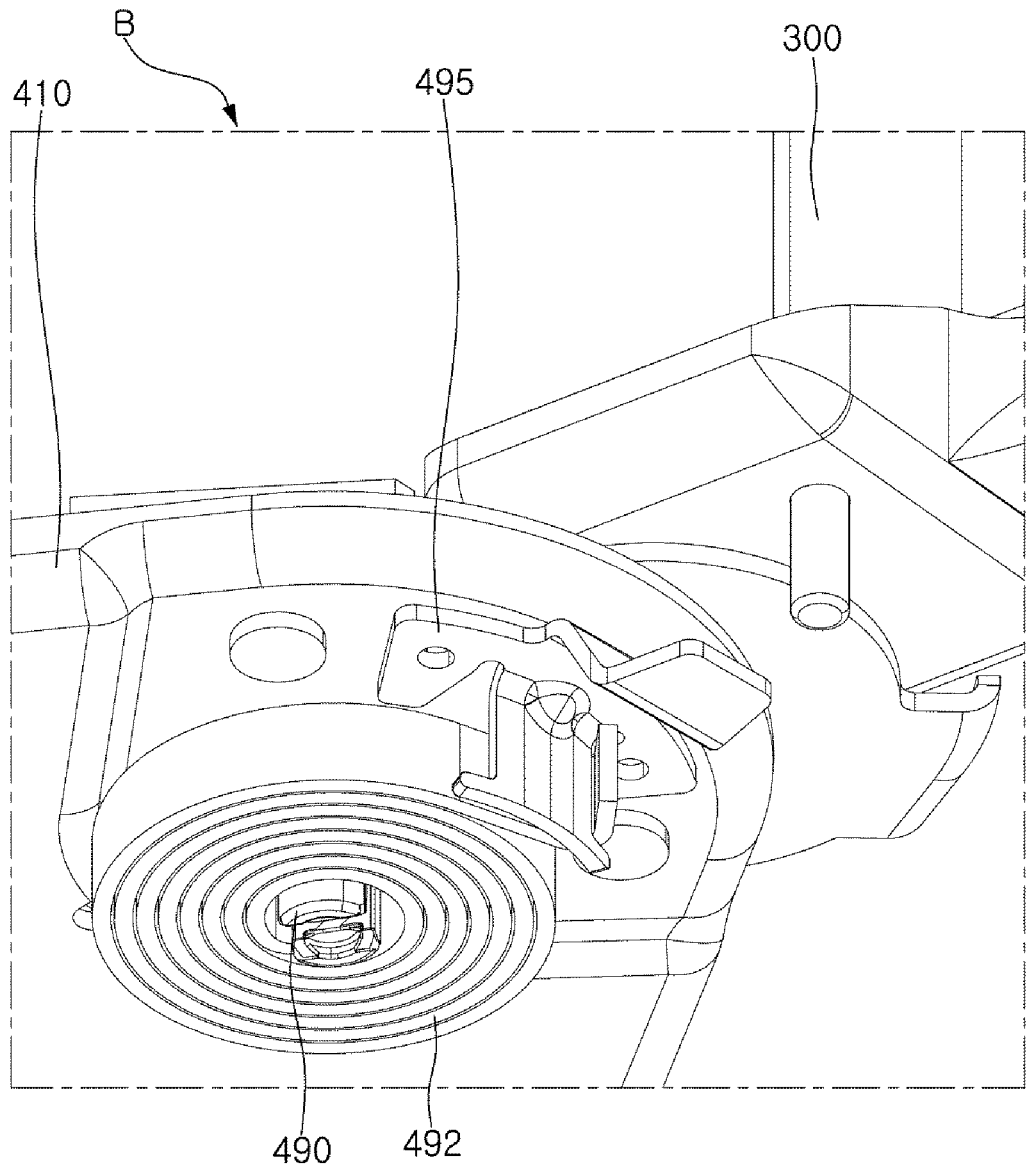

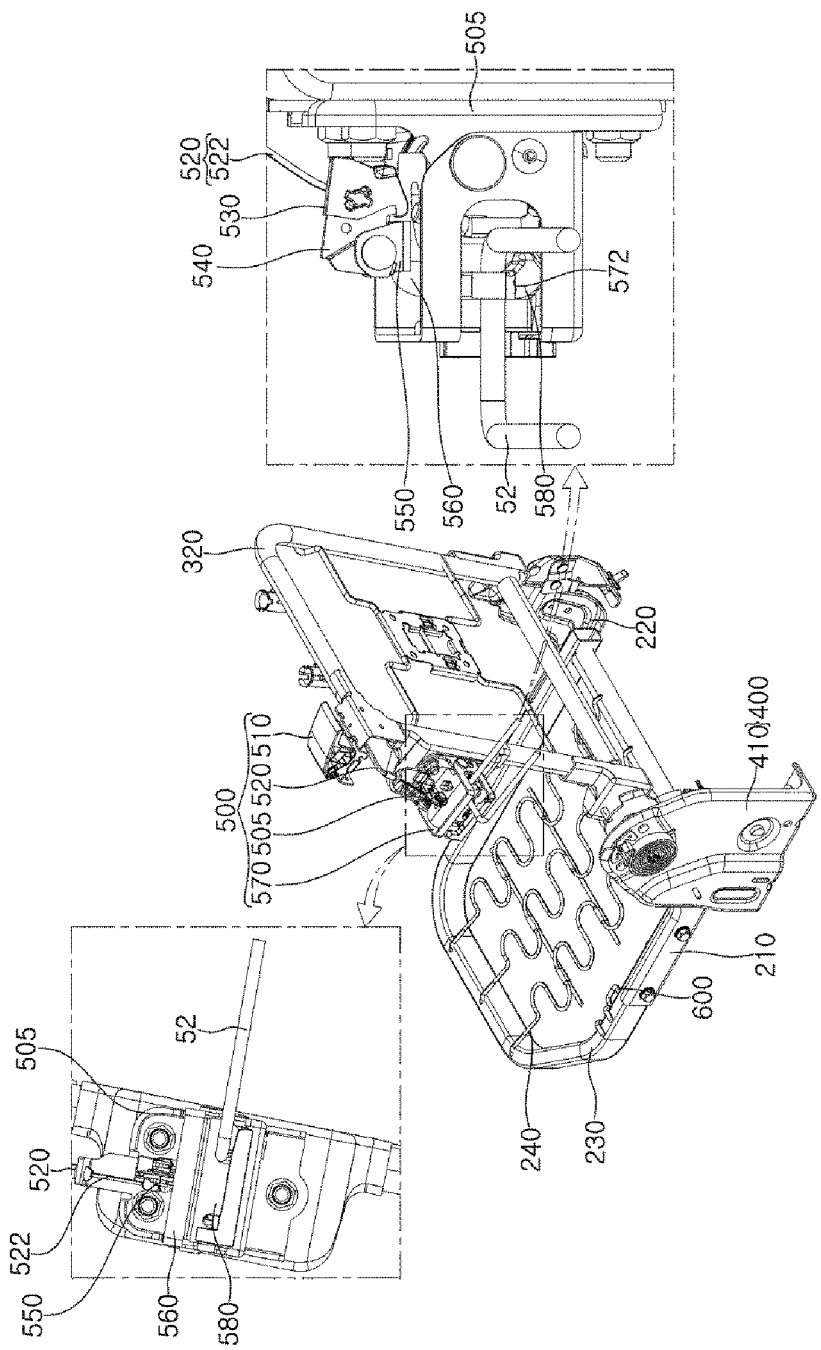
[FIG. 5]

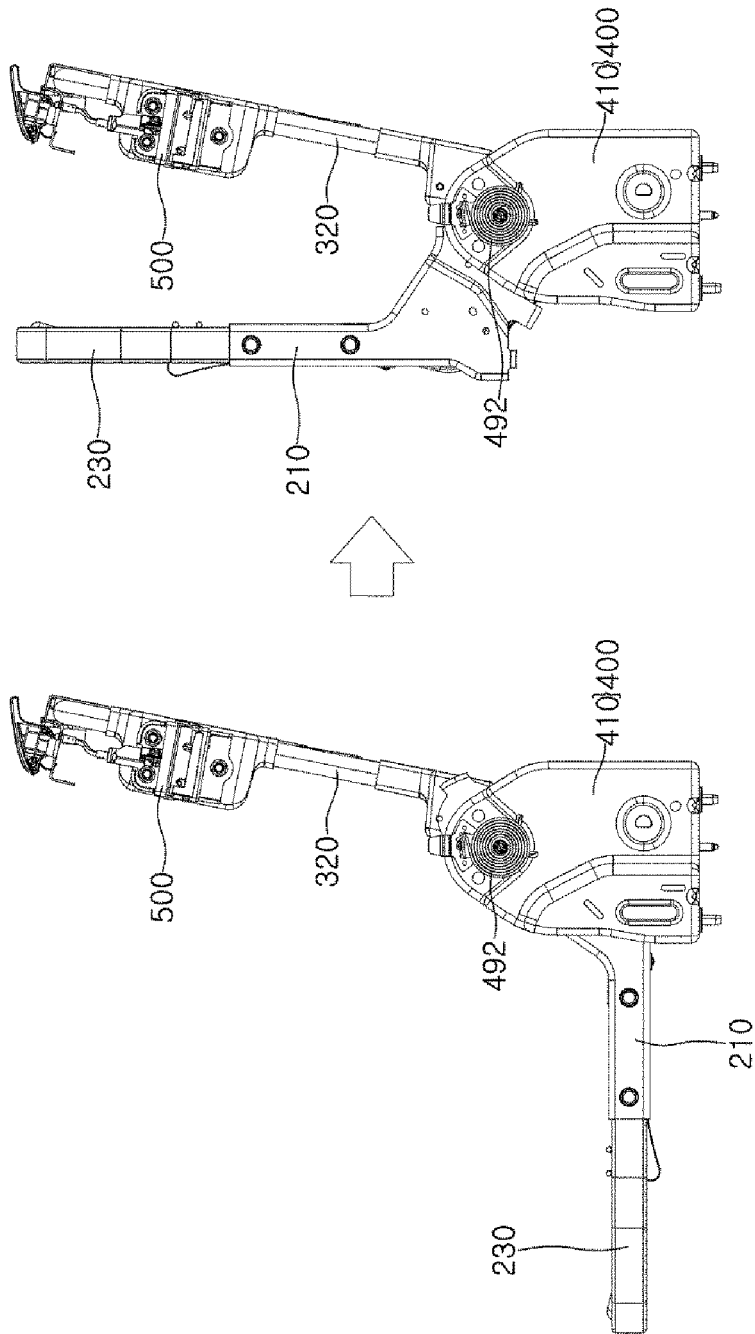
[Fig. 6]

FOLDING SEAT

CROSS REFERENCE TO RELATED APPLICATION

The present application claims priority to Korean Patent Application No. 10-2020-0136891, filed Oct. 21, 2020, the entire contents of which is incorporated herein for all purposes by this reference.

BACKGROUND OF THE INVENTION

Field of the Invention

The present disclosure relates generally to a seat. More particularly, the present disclosure relates to a folding seat which can be folded.

Description of the Related Art

Unless otherwise indicated herein, contents described in this identification are not prior art to the claims of this application, and the description in this identification is not admitted to be prior art.

In general, as for a folding seat used in a vehicle, the utilization of space inside the vehicle can be improved by folding the folding seat or moving the folding seat inside the vehicle. In particular, in the case of a rear seat, the utilization of a loading space inside a vehicle can be improved by folding the rear seat or moving a position thereof.

However, in the case of the existing folding seat, parts used to fold a seat frame supporting a passenger's lower body toward a seat back or to fix the seat frame are complicated and diverse, so the weight of the seat increases and maintenance cost thereof increases.

In addition, the folding direction of the seat frame or a seat back frame constituting the folding seat is limited, and thus the utilization of space around the folding seat through the folding of the folding seat is limited.

In this regard, "LOCKING EQUIPMENT FOR FOLDING SEAT OF VEHICLE" is disclosed in Korean Patent No. 10-0794038, and "LEG REST FOR VEHICLE" is disclosed in Korean Patent No. 10-1643888.

However, the existing inventions do not provide a technology through which various spaces are provided around the folding seat by folding the folding seat together with the seat back frame.

SUMMARY OF THE INVENTION

Accordingly, the present disclosure has been made keeping in mind the above problems occurring in the related art, and the present disclosure is intended to propose a folding seat which can be folded by manipulating a lever at various positions so as to improve the utilization of space around the folding seat.

In addition, the objective of the present disclosure is not limited to the objective described above, and it is obvious that other objectives can be achieved from the following description.

In order to achieve the above objectives, according to one aspect of the present disclosure, there is provided a folding seat including: a seat frame; a seat back frame located at a rear of the seat frame and coupled rotatably to the seat frame or a vehicle; and a first latch part provided with a side support, a first end of the side support being coupled to the vehicle and a second end of the side support being coupled to the rear of the seat frame through a rotation shaft such that the seat frame is rotatable, wherein the first latch part further includes: a hook having a lower part located behind the rotation shaft and coupled elastically rotatably to the seat frame and having an upper part extending upward from the lower part and coupled to a holding jaw formed on the side support, and a strap connected to a lower end of the hook through a cable and extending forward.

In addition, the first latch part may further include: a holding jaw part having a first end being plate-shaped and coupled to an upper part of the side support, and a second end extending downward from a center of the first end, a portion of the second end of the holding jaw part being configured to have a shape of a holding jaw having a flat upper surface and to protrude rearward.

Furthermore, a first end of the hook may be connected to the strap through a cable, a center part of the hook may extend upward from the first end thereof and may be located at a position located under a rear of the holding jaw part so as to be coupled to the seat frame, and a second end of the hook may extend upward from the center part and then a portion of the second end of the hook may bend and extend forward so as to be in close contact with the flat surface of the holding jaw part.

Additionally, the first latch part may further include: a spring having a first end coupled to the center part of the hook, and a second end extending rearward and coupled to the seat frame, the spring being configured to supply an elastic force to the hook such that a second end of the hook moves forward.

In addition, a first end of the rotation shaft may be coupled rotatably to an outer side of the side support, and a second end of the rotation shaft may be coupled to the seat frame by passing through the side support and the holding jaw part.

Furthermore, the folding seat may further include: a second latch part attached to the seat back frame and configured to be attached to and detached from a hook coupled to the vehicle.

In the folding seat according to an embodiment disclosed in this specification, the seat frame can be conveniently folded toward the seat back frame by manipulating the strap disposed under the seat frame, thereby improving the utilization of space in which the seat frame is located.

In addition, in the folding seat, while the seat frame surrounds the rotation shaft to which the seat frame is rotatably coupled, the hook coupled to the seat frame is coupled to the holding jaw part, thereby enabling the stable folding of the seat frame and improving the coupling force of the hook to the holding jaw part.

Furthermore, the effects of the folding seat of the present disclosure as described above are naturally achieved by the described content regardless of whether an inventor recognizes the effects. Accordingly, the above-described effects are only a few effects according to the described content, and it should not be admitted that all the effects that have been identified by the inventor or exist have been described.

In addition, other effects of the folding seat of the present disclosure should be further grasped by the overall description of the present specification, and if the other effects can be recognized through this specification by those skilled in the art to which the described content belongs even if the other effects are not described in explicit sentences, the other effects should be considered as effects described in the present specification.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 1 is a view illustrating the states of the use of a folding seat according to an embodiment of the present disclosure;

FIG. 2 is a perspective view of the folding seat of FIG. 1;

FIG. 3 is exploded perspective view and sectional view of the folding seat of FIG. 1;

FIG. 4 is an enlarged perspective view of a portion of the folding seat of FIG. 1;

FIG. 5 illustrates enlarged perspective views of a latch part of the folding seat of FIG. 1; and FIG. 6 illustrates side views of the operation of the folding seat of FIG. 1.

DETAILED DESCRIPTION OF THE INVENTION

Hereinafter, the configuration, operation, and effects of a folding seat according to an exemplary embodiment of the present disclosure will be described with reference to the accompanying drawings. For reference, in the following drawings, each component is omitted or schematically illustrated for the convenience and clarity of the description of the present disclosure, and the size of each component does not reflect the actual size. Additionally, the same reference numerals refer to the same components throughout the specification, and reference numerals for the same components in individual drawings will be omitted.

In general, as for a folding seat used in a vehicle, the utilization of space inside the vehicle can be improved by folding the folding seat or moving the folding seat inside the vehicle. In particular, in the case of a rear seat, the utilization of a loading space inside a vehicle can be improved by folding the rear seat or moving a position thereof.

However, in the case of the existing folding seat, parts used to fold a seat frame supporting a passenger's lower body toward a seat back or to fix the seat frame are complicated and divers, so the weight of the seat increases and maintenance cost thereof increases.

In the folding seat 100 of the present disclosure, the seat frame can be conveniently folded toward the seat back frame by manipulating a strap disposed under the seat frame, thereby improving the utilization of space in which the seat frame is located.

In addition, in the folding seat 100, while the seat frame surrounds a rotation shaft to which the seat frame is rotatably coupled, a hook coupled to the seat frame is coupled to a holding jaw part, thereby enabling the stable folding of the seat frame and improving the coupling force of the hook to the holding jaw part.

The folding seat 100 includes the seat frame 200, the seat back frame 300, a first latch part 400, and a second latch part 500.

The seat frame 200 includes a first frame 210, a second frame 220, a third frame 230, a heating wire unit 240, and a guide 250.

The seat frame 200 is coupled to the first latch part 400 at a first end part thereof located at a side of a second direction 2 corresponding to a rear side of the seat frame 200 such that the seat frame 200 can rotate relative to a shaft extending toward a first or second side thereof, and a second end part of the seat frame 200 is formed by extending in a first direction 1 corresponding to a front side of the seat frame 200 and supports a passenger's lower body.

The first end of the first frame 210 is configured to have a plate shape having a surface of a large area directed toward each of the first and second sides, and is disposed at a side of the first latch part 400 to be coupled rotatably to a portion thereof, and the second end of the first frame 210 is formed in such a manner that a lower portion of the first frame 210 corresponding to a lower portion of the side of the first direction 1 extends in the first direction 1.

The first end of the second frame 220 is configured to have a plate shape having a surface of a large area directed toward each of the first and second sides, and is disposed at the second side of the first frame 210 by being spaced apart therefrom, and is coupled to a lower frame 50 coupled to a vehicle such that the second frame 220 can rotate relative to the shaft extending toward the first or second side.

The second end of the second frame 220 is formed by extending a portion of the front lower part of the first end thereof by a predetermined distance in the first direction 1, and a portion of each of the upper and lower edges of the second end of the second frame 220 bends toward a side, and thus the second frame 220 is coupled to the third frame 230 by surrounding the third frame 230.

The first end of the third frame 230 is configured to have a shape of a rectangular pipe extending in the first or second direction 1 or 2, and is coupled removably to the inside of the second end of the first frame 210, and the center part of the third frame 230 is formed in such a manner that a portion of a first side of the first direction 1 of the first end of the third frame 230 bends and extends toward the second side of the third frame 230.

The second end of the third frame 230 is coupled removably to the inside of the second end of the second frame 220 by perpendicularly bending and extending an end portion of the second side of the center part thereof in the second direction 2.

A cylindrical connection frame extending to opposite sides is disposed between an end portion of the second end of the third frame 230 and an end portion of the first end thereof, and the opposite ends of the connection frame are coupled to the first and second ends of the third frame 230, respectively.

Referring to FIG. 2, the first end of the guide 250 is configured to have a shape of a hook which is in close contact with the upper and side surfaces of the second end of the second frame 220 and is bent perpendicularly thereto, and is coupled to the second frame 220, and the second end of the guide 250 bends and extends toward the second side from a lower portion of the first end of the guide 250.

The first end of the heating wire unit 240 is coupled to the connection frame, and the second end thereof extends in the first direction 1 from the first end to have a waveform protruding alternately toward the first and second sides and is coupled to the center part of the third frame 230.

A plurality of heating wire units 240 are disposed at the first side or the second side by being spaced apart at the same intervals from each other, and the first and second ends of each of the heating wire units 240 are coupled to the connection frame and the center part of the third frame 230, respectively.

The seat back frame 300 includes the connection frame 310 and an upper frame 320.

The first end part of the seat back frame 300 is formed by upward and vertically bending first and second side portions of a cylinder extending toward opposite sides, and the second end part of the seat back frame 300 is formed in such a manner that the first and second side portions of the first end part of the seat back frame 300 extend upward by predetermined distances and then bend and extend in directions facing each other to be connected to each other.

The first end of the connection frame 310 extends from the upper portion of the first end of the first frame 210 toward the second side such that the connection frame 310 has a cylindrical shape, and the second end of the connection frame 310 is formed by extending by a predetermined distance toward the second side from the first end of the connection frame 310 while maintaining the shape of the first end of the connection frame 310.

The first end of the connection frame 310 is located inside the first end of each of the first latch part 400 and the first frame 210 and is coupled to a rotation shaft, which passes through the first latch part 400 and the first frame 210, or to a side support 410 such that the connection frame 310 can rotate relative to the shaft extending toward the first or second side.

The second end of the connection frame 310 extends toward the second side from the first end thereof and is located inside the first end of each of the lower frame 50 and the second frame 220 and is coupled to a rotation shaft passing through the lower frame 50 and the second frame 220 such that the connection frame 310 can rotate relative to the shaft extending toward the first or second side.

Meanwhile, the first and second ends of the connection frame 310 may be coupled rotatably to each of separate lower frames coupled to a vehicle in a state in which the first and second ends of the connection frame 310 are separated from the seat frame 200.

The first end of the upper frame 320 is configured to have a cylindrical shape extending in upward and downward directions, and an inner side surface of the first end of the upper frame 320 is coupled to a side of the first end of the connection frame 310, and extends upward by a predetermined distance.

The center part of the upper frame 320 is formed such that a portion of the upper end of the first end of the upper frame 320 bends toward the second side and extends by a predetermined distance such that the center part of the upper frame 320 is parallel to the connection frame 310, and the second end of the upper frame 320 is formed by bending downward and extending from the center part thereof such that the second end of the upper frame 320 is coupled to the second end of the connection frame 310.

The first latch part 400 includes: the side support 410, a first rotation shaft 420, a first spring 430, a hook 440, a fixing unit 450, the holding jaw part 460, a first cable 470, and the strap 480.

The first end part of the first latch part 400 is located at the lower part of the seat back frame 300 and is coupled to a vehicle, and the second end part of the first latch part 400 extends upward from the first end part thereof and is coupled to the first end part of the seat frame 200 such that the seat frame 200 is rotatable.

The first end of the side support 410 is configured to have a plate shape having large opposite side surfaces facing first and second sides, respectively, and is coupled to the bottom of a vehicle. The second end of the side support 410 extends from the first end thereof while gradually decreasing in a front-to-rear directional length upward from the first end thereof, and is coupled to the first end of the first frame 210 and to the first end part of the seat back frame 300 such that the first frame 210 and the seat back frame 300 are rotatable.

The first end of the first rotation shaft 420 is configured to have a cylindrical shape extending to the first or second side, and is coupled to the center part of the hook 440 at the first side of the first frame 210. The second end of the first rotation shaft 420 passes through the first end of the first frame 210 by extending toward the second side of the first frame 210 from the first end of the first rotation shaft 420 and then is coupled to the first end of the first spring 430 surrounding the first rotation shaft 420.

The first end of the first spring 430 is coupled to the second end of the first rotation shaft 420, and the center part of the first spring 430 is formed by extending spirally toward a first side of the first rotation shaft 420 from the first end of the first spring 430 and surrounds the outer side of the first rotation shaft 420, and the second end of the first spring 430 is formed by extending from the center part thereof in the second direction 2 and is coupled to the rear portion of the first end of the first frame 210.

When seeing the first rotation shaft 420 from a second side of the first rotation shaft 420, the center part of the first spring 430 spirally extends clockwise and toward the first side of the first rotation shaft 420, and surrounds the first rotation shaft 420.

The first end of the hook 440 is coupled to the fixing unit 450 located at a side of the first frame 210 and coupled to the first cable 470, and the center part of the hook 440 extends slantingly from the first end thereof in the first direction 1 and upward and is coupled to the first end of the first rotation shaft 420.

The second end of the hook 440 is configured to have a shape of a hook by bending and extending a portion of the upper end of the hook 440 in the first direction 1 after extending by a predetermined distance upward from the center part of the hook 440, and is coupled to the holding jaw part 460 coupled to the side support 410.

The first end of the fixing unit 450 is coupled to the first end of the hook 440 at a first side of the fixing unit 450, and the second end of the fixing unit 450 is formed by extending to a second side of the fixing unit 450 from the first end thereof and is coupled removably to the first end of the first cable 470.

In the first end of the holding jaw part 460, parts located at the second side of the side support 410 and located at sides of the first and second directions 1 and 2, respectively, extend slantingly upward in the first and second directions 1 and 2 and are coupled to the second side of the side support 410.

The second end of the holding jaw part 460 is formed by extending by a predetermined distance downward from the first end thereof and then protruding a lower end of the holding jaw part 460 in the second direction 2 such that the second end of the holding jaw part 460 has a shape of a holding jaw having a flat surface 461 formed on an upper portion thereof.

The flat surface 461 of the holding jaw part 460 is in surface contact with a flat coupling surface 442 formed on a lower portion of the second end of the hook 440, and when the second end of the hook 440 moves in the second direction 2 relative to the center part of the hook 440, the flat surface 461 and the coupling surface 442 are separated from each other and the first frame 210 is converted to a rotatable state.

Contrarily, when the coupling surface 442 is in surface contact with the flat surface 461, the rotation of the first frame 210 is prevented, and when a passenger's weight is applied to the second end part of the seat frame 200, a coupling force between the second end of the hook 440 and the second end of the holding jaw part 460 increases, so the seat frame 200 stably supports the passenger.

The first cable 470 includes a wire 471 and a sheath 472.

The first end of the first cable 470 is coupled removably to the second end of the fixing unit 450, and extends slantingly downward in the first direction 1, and the second end of the first cable 470 is coupled to the strap 480 by bending and extending from the first end thereof in the first direction 1.

The first end of the wire 471 is coupled to the second end of the fixing unit 450, and the second end of the wire 471 extends in the first direction 1 and is coupled to the first end of the strap 480. When the strap 480 moves in the first direction 1, the second end of the hook 440 moves in the second direction 2 and the coupling surface 442 and the flat surface 461 are separated from each other.

The sheath 472 covers a portion of the wire 471 located between the fixing unit 450 and the strap 480, and the wire 471 is disposed movably inside the sheath 472.

When the coupling surface 442 and the flat surface 461 are separated from each other due to the second end of the hook 440 moved in the second direction 2 by the strap 480, the first end of the first frame 210 is converted to a state rotatable relative to a second rotation shaft 490 coupled rotatably to the side support 410.

In the state in which the first frame 210 is converted to the rotatable state, a passenger can fold the seat frame 200 toward the front of the seat back frame 300 by moving the second end part of the seat frame 200 in the second direction 2 and upward.

The first end of the strap 480 is coupled to the second end of the wire 471 disposed at the second side of the first end of the second frame 220, and the second end of the strap 480 passes by the upper and lower portions of the second end of the guide 250 and of the guide 250 and is connected to the first end of the strap 480 at the side of the first direction 1, so the strap 480 surrounds the guide 250.

Accordingly, due to the guide 250, the strap 480 can slide on the same horizontal line in the first or second direction 1 or 2, and thus a passenger can easily check the position of the strap 480 and can grip the strap 480.

The first end of the second rotation shaft 490 is disposed at the first side of the side support 410 and is coupled to a second spring 492, and the second end of the second rotation shaft 490 is formed by extending toward the second side of the side support 410 by passing through the side support 410 and the holding jaw part 460 and is located at the second side of the holding jaw part 460 and is coupled to the first end of the first frame 210.

The first end of the first frame 210 rotates relative to the second rotation shaft 490, and while the first frame 210 rotates, the first rotation shaft 420, the first spring 430, the hook 440, the fixing unit 450, the first cable 470, and the strap 480 which are coupled to the first frame 210 also move.

The first end of the second spring 492 is coupled to the first end of the second rotation shaft 490, and when seeing the side support 410 from the first side of the side support 410, the center part of the second spring 492 is formed by extending in the shape of a spiral coil clockwise from the first end thereof and surrounds the outer side of the second rotation shaft 490.

The second end of the second spring 492 bends and extends upward from the center part thereof and is coupled removably to a bracket 495. The second spring 492 supplies elastic force to the second rotation shaft 490 such that the seat frame 200 is elastically rotated to an initial position thereof when the second end part of the seat frame 200 is folded in the second direction 2 and upward due to the rotation of the first end of the first frame 210.

The second latch part 500 includes: a fixing bracket 505, a lever 510, a second cable 520, a first cover 530, a first connection bracket 540, a second connection bracket 550, a claw 560, a guide bracket 570, and a second cover 580.

The second latch part 500 is coupled to an upper portion of a side portion of the upper frame 320, and is coupled removably to a hook 52 formed on a side surface or rear of a vehicle. The position of the second latch part 500 can be adjusted by a passenger's manipulation.

The fixing bracket 505 extends upward or downward, and a portion of an edge of the fixing bracket 505 located at a side of each of the first and second directions 1 and 2's therefrom toward a side and is coupled to the first end part of the claw 560 such that the claw can rotate relative to a shaft extending toward the first or second direction 1 or 2.

The lever 510 is coupled elastically rotatably to an upper part of a side of the center part of the upper frame 320 relative to the shaft extending toward the first or second side, and the second latch part 500 is operated by manipulating the lever 510 such that the second latch part 500 is coupled removably to the hook 52.

The second cable 520 includes a wire 522.

The first end of the second cable 520 is connected to the lever 510, and the second end of the second cable 520 extends downward from the first end thereof and is disposed at a side of the upper frame 320, and the wire 522 disposed inside the second cable 520 protrudes at the second end of the second cable 520 and is coupled to the first cover 530 and the first connection bracket 540.

The first end of the first connection bracket 540 covered by the first cover 530 is connected to the wire 522, and the second end of the first connection bracket 540 extends to a side and is coupled rotatably to the second connection bracket 550 relative to the shaft extending toward the first or second direction 1 or 2.

The lower part of the second connection bracket 550 is coupled to the upper part of the first end part of the claw 560, and when the wire 522 is moved upward by manipulating the lever 510, the first and second connection brackets 540 and 550 and the first end part of the claw 560 are moved upward.

The first end part of the claw 560 is configured to have a shape of a horizontal plate having a large surface disposed toward each of upper and lower sides, and is coupled rotatably to the fixing bracket 505, and portions of three edges of the second end part of the claw 560 disposed by being spaced apart from the first end part thereof in a front-to-rear direction protrude downward and are configured to have a shape of a fork surrounding two fork grooves.

Accordingly, in a state in which the hook 52 is disposed at a lower side of the second end part of the claw 560 moved upward through the wire 522, when the second end part of the claw 560 lowers, the hook 52 is inserted and fastened to any one of the fork grooves.

The second cover 580 covers the second end part of the claw 560 by being in close contact therewith, and is coupled to the claw 560, and decreases noise occurring in a process in which the claw 560 is fastened to the hook 52.

The center part of the guide bracket 570 is configured to have a shape of a vertical plate extending the first or second direction 1 or 2, and a portion of the center part of the guide bracket 570 directed in each of the first and second directions 1 and 2 bends and extends toward the second side, and is coupled to each of the front and rear surfaces of the fixing bracket 505 directed in the first and second directions 1 and 2, respectively.

A guide groove 572 is formed at a side of the guide bracket 570 and at the side of the second direction 2 by passing therethrough such that the guide groove 572 is connected to the guide bracket 570, and the hook 52 is inserted to the fork groove by being inserted to the guide groove 572 and being guided by the guide bracket 570.

Accordingly, as for the seat back frame 300, an angle between the seat frame 200 and the seat back frame 300 can be adjusted by inserting the hook 52 to the fork groove of the claw 560 by manipulating the lever 510, and the seat back frame 300 can be folded in the first direction 1 and downward by separating the hook 52 from the second latch part 500.

Although the exemplary embodiment of the present disclosure has been described with reference to the accompanying drawings, the embodiment described in the present specification and configurations shown in the drawings are only the exemplary embodiment of the present disclosure, but do not represent all the technical ideas of the present disclosure. Therefore, it should be understood that there may be various equivalents and modifications that can be substituted for them at the time of filing the present application. Therefore, the embodiment described above is to be understood as illustrative and not restrictive in all respects, and the scope of the present disclosure is indicated by the following claims rather than the detailed description, and the meaning and scope of the claims and all changes or modifications derived from concept equivalent thereto should be construed as being included in the scope of the present disclosure.

DESCRIPTION OF THE REFERENCE NUMERALS IN THE DRAWINGS

100: folding seat,
200: seat frame
300: seat back frame,
400: first latch part
500: second latch part

What is claimed is:

1. A folding seat comprising:
   a seat frame;
   a seat back frame located at a rear of the seat frame and coupled rotatably to the seat frame or a vehicle; and
   a first latch part provided with a side support, a first end of the side support being coupled to the vehicle and a second end of the side support being coupled to the rear of the seat frame through a rotation shaft such that the seat frame is rotatable,
   wherein the first latch part further comprises:
   a holding jaw part having a first end being plate-shaped and coupled to an upper part of the side support, and a second end extending downward from a center of the first end, a portion of the second end of the holding jaw part being configured to have a shape of a holding jaw having a flat upper surface and to protrude rearward, and
   a hook having a lower part located behind the rotation shaft and coupled elastically rotatably to the seat frame and having an upper part extending upward from the lower part and coupled to the portion of the second end of the holding jaw part which is configured to have a shape of a holding jaw.

2. The folding seat of claim 1,
   wherein the first latch part further comprises a strap connected to a lower end of the hook through a cable and extending forward, and
   wherein a first end of the hook is connected to the strap through a cable, a center part of the hook extends upward from the first end thereof and is located at a position located under a rear of the holding jaw part so as to be coupled to the seat frame, and a second end of the hook extends upward from the center part and then a portion of the second end of the hook bends and extends forward so as to be in close contact with the flat surface of the holding jaw part.

3. The folding seat of claim 1, wherein the first latch part further comprises:
   a spring having a first end coupled to the center part of the hook, and a second end extending rearward and coupled to the seat frame, the spring being configured to supply an elastic force to the hook such that a second end of the hook moves forward.

4. The folding seat of claim 1, wherein a first end of the rotation shaft is coupled rotatably to an outer side of the side support, and a second end of the rotation shaft is coupled to the seat frame by passing through the side support and the holding jaw part.

5. The folding seat of claim 1, further comprising:
   a second latch part attached to the seat back frame and configured to be attached to and detached from a hook coupled to the vehicle.

\* \* \* \* \*